(12) United States Patent  
Khorashadi et al.

(10) Patent No.: US 8,954,267 B2  
(45) Date of Patent: Feb. 10, 2015

(54) MOBILE DEVICE POSITIONING

(71) Applicant: QUALCOMM Incorporated, San Diego, CA (US)

(72) Inventors: Behrooz Khorashadi, Mountain View, CA (US); Saumitra Mohan Das, Santa Clara, CA (US); Hui Chao, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/773,309

(22) Filed: Feb. 21, 2013

(65) Prior Publication Data

US 2014/0236476 A1      Aug. 21, 2014

(51) Int. Cl.  
*H04W 4/02* (2009.01)  
*G01C 21/00* (2006.01)  
(Continued)

(52) U.S. Cl.  
CPC .............. *G01C 21/00* (2013.01); *G01C 21/206* (2013.01); *G01S 19/42* (2013.01); *H04W 4/02* (2013.01); *H04W 64/00* (2013.01); *G01S 5/0252* (2013.01)  
USPC ......... 701/445; 701/450; 701/451; 455/456.1

(58) Field of Classification Search  
CPC ......... H04W 4/02; H04W 4/025; H04W 4/04; H04W 4/00; H04W 48/20; H04W 64/00; H04W 48/04; G01S 19/48; G01S 19/46  
USPC ......... 701/445, 446, 447, 450, 451, 454, 409; 455/456.1, 456.6, 456.5, 404.2; 370/328, 352

See application file for complete search history.

(56) References Cited

U.S. PATENT DOCUMENTS 6,199,012 B1     3/2001  Hasegawa  
6,965,760 B1 *  11/2005  Chen et al. ................. 455/226.1

(Continued)

FOREIGN PATENT DOCUMENTS

WO       2011047310 A1      4/2011

OTHER PUBLICATIONS

Setiya R., et al., "Fingerprinting based Localization of Mobile Terminals using IEEE802.11," World Journal of Science and Technology, 2012, vol. 2 (3), pp. 111-114.

(Continued)

*Primary Examiner* — Richard Camby  
(74) *Attorney, Agent, or Firm* — Hunter Clark PLLC

(57) ABSTRACT

Methods, apparatus, and computer program products for determining a mobile device location. An example of a method for determining a mobile device location includes receiving signals from a transmitter, measuring signal characteristics of the received signals, and downloading data from a database corresponding to a defined region associated with the transmitters. The downloaded data includes a set of position points, a classification of each position point, and expected signal characteristics for each position point. The method further includes comparing the measured signal characteristics with the expected signal characteristics for each position point, assigning a weight to position points based on the compared signal characteristics, and determining the mobile device location by selecting one position point from the set as a position point solution corresponding to the mobile device location based on the assigned weight. The position point solution is constrained by the classification of each position point.

32 Claims, 10 Drawing Sheets

(51) Int. Cl.
*G01C 21/20* (2006.01)
*G01S 19/42* (2010.01)
*H04W 64/00* (2009.01)
*G01S 5/02* (2010.01)

(56) References Cited

U.S. PATENT DOCUMENTS

| | | | |
|---|---|---|---|
| 7,194,275 B2 | 3/2007 | Bolin et al. | |
| 7,925,995 B2 | 4/2011 | Krumm et al. | |
| 8,106,818 B2 | 1/2012 | Bhattacharya et al. | |
| 8,467,805 B2 * | 6/2013 | Harper | 455/456.1 |
| 8,489,122 B2 * | 7/2013 | Gravely et al. | 455/456.5 |
| 8,532,024 B2 * | 9/2013 | Arpee et al. | 370/328 |
| 8,548,492 B2 * | 10/2013 | Islam et al. | 455/456.1 |
| 2004/0096083 A1 | 5/2004 | Matsunaga et al. | |
| 2009/0132163 A1 | 5/2009 | Ashley, Jr. et al. | |
| 2010/0121567 A1 | 5/2010 | Mendelson | |
| 2011/0081919 A1 | 4/2011 | Das et al. | |
| 2011/0103360 A1 | 5/2011 | Ku et al. | |
| 2011/0190004 A1 | 8/2011 | Tenny et al. | |
| 2012/0015665 A1 | 1/2012 | Farley et al. | |
| 2012/0072106 A1 | 3/2012 | Han et al. | |
| 2012/0225663 A1 | 9/2012 | Gupta et al. | |
| 2012/0254804 A1 | 10/2012 | Sheha et al. | |
| 2013/0030747 A1 | 1/2013 | Ganick et al. | |

OTHER PUBLICATIONS

Co-pending U.S. Appl. No. 13/791,358, filed Mar. 8, 2013.
Co-pending U.S. Appl. No. 14/083,258, filed Nov. 18, 2013.
International Search Report and Written Opinion—PCT/US2014/011951—ISA/EPO—May 16, 2014.

* cited by examiner

MOBILE DEVICE POSITIONING

BACKGROUND

The Global Positioning System (GPS) and other similar satellite positioning systems have enabled navigation services for mobile devices in outdoor environments. Since satellite signals may not be always reliably received and/or acquired in an indoor environment or in some particular outdoor environments, different techniques may be employed to enable position determination and related navigation services. The signals transmitted by cellular network access points (AP) can be used for positioning in such areas. Because signals from these terrestrial radio transmitters are usually available and associated with indoor structures, positioning using these signals is often used for indoor positioning. However, the systems and methods can apply to any defined region or area for which AP signals are available.

Mobile devices can typically obtain positioning information, for example, by obtaining a MAC ID address or other identifying information from signals received from APs or other terrestrial radio transmitters and by measuring one or more characteristics of signals received from such APs such as, for example, signal strength (e.g., an RSSI) and/or propagation time (e.g., a round-trip time (RTT)) for signals exchanged with various radio transmitters (e.g., APs, beacons, etc.).

In some implementations, the MAC IDs included in the AP signals can be used to identify the defined area associated with the APs and to locate the APs with respect to the defined area. Using the identification of the defined area, a mobile device may access a digital electronic map, for example, as a mobile device enters a particular defined area. Such a map may show indoor features, such as doors, hallways, entry ways, walls, etc., points of interest, such as bathrooms, room names, stores etc., as well as outdoor features such as courtyards, parking lots, yards, gardens, fencing, water features or any other outdoor structures or boundaries. Such a digital electronic map may be stored at a server to be accessible by the mobile device through the wireless network or, for example, through selection of an Internet based URL. The digital map may be available in a graphic form for display to a user of the mobile device or it may be available in a data format suitable for position calculations or other calculations done by the mobile device or the server.

The map of the defined region may be analyzed by classifying map locations as interior or exterior position points. Signal analysis may be combined with such a set of classified position points to more efficiently and accurately determine a mobile device position point solution by constraining the position point solution to certain classified position points. Combining signal analysis with such a constrained position point solution can be more efficient and accurate than position determination using signal analysis methods such as, for example, fingerprinting or triangulation methods. The determined mobile device position can be combined with the mapping information for the defined area to locate the mobile device on the defined area map for use in various applications, including navigation applications.

SUMMARY

An example of a method of determining a mobile device location according to the disclosure may include receiving one or more signals from one or more transmitters, measuring signal characteristics of the one or more received signals, downloading data from a database corresponding to a defined region associated with the transmitters wherein the downloaded data comprises a plurality of position points, a classification of each position point, and expected signal characteristics for each position point, comparing the measured signal characteristics with the expected signal characteristics for each position point, assigning a weight to position points based on factors including the compared signal characteristics, and determining the mobile device location by selecting one position point of the plurality of position points as a position point solution corresponding to the mobile device location based on the assigned weight wherein the position point solution is constrained by the classification of each position point.

Implementations of such a method may include one or more of the following features. The classification of each position point may be as an interior position point or as an exterior position point based on the output of an interior-exterior classification algorithm. The interior-exterior classification algorithm may be a morphological operation function. The interior-exterior classification algorithm may be a multiple ray mechanism. The position point solution may be constrained by the classification of each position point by limiting the downloaded data to a particular position point classification. The downloaded data may be limited to interior classified position points. The position point solution may be constrained by the classification of each position point by assigning zero weight to each exterior classified position point. The method may include determining transmitter identifying information from the received signals, downloading transmitter location information based on the transmitter identifying information, and estimating a mobile device position based at least in part on the transmitter location information. The downloaded data may correspond to a map tile associated with the estimated mobile device position. Selecting one position point as the mobile device location may include using a statistical measure of the weights assigned to the position points.

An example of an apparatus for determining a mobile device location according to the disclosure may include a transceiver configured to receive one or more signals from one or more transmitters, one or more processors communicatively coupled to the transceiver and configured to measure signal characteristics of the one or more received signals, download data from a database corresponding to a defined region associated with the transmitters wherein the downloaded data comprises a plurality of position points, a classification of each position point, and expected signal characteristics for each position point, compare the measured signal characteristics with the expected signal characteristics for each position point, assign a weight to position points based on factors including the compared signal characteristics, and determine the mobile device location by selecting one position point of the plurality of position points as a position point solution corresponding to the mobile device location based on the assigned weight wherein the position point solution is constrained by the classification of each position point, and a memory communicatively coupled to the one or more processors to store the downloaded data.

Implementations of such an apparatus may include one or more of the following features. The classification of each position point may be as an interior position point or as an exterior position point based on the output of an interior-exterior classification algorithm. The interior-exterior classification algorithm may be a morphological operation function. The interior-exterior classification algorithm may be a multiple ray mechanism. The position point solution may be constrained by the classification of each position point by limiting the downloaded data to a particular position point classification. The downloaded data may be limited to interior classified position points. The position point solution may be constrained by the classification of each position point by assigning zero weight to each exterior classified position point. The apparatus may include one or more processors configured to determine transmitter identifying information from the received signals, download transmitter location information based on the transmitter identifying information, and estimate a mobile device position based at least in part on the transmitter location information. The downloaded data may correspond to a map tile associated with the estimated mobile device position. Selecting one position point as the mobile device location may include using a statistical measure of the weights assigned to the position points.

An example of an apparatus for determining a mobile device location according to the disclosure may include means for receiving one or more signals from one or more transmitters, means for measuring signal characteristics of the one or more received signals, means for downloading data from a database corresponding to a defined region associated with the transmitters wherein the downloaded data comprises a plurality of position points, a classification of each position point, and expected signal characteristics for each position point, means for comparing the measured signal characteristics with the expected signal characteristics for each position point, means for assigning a weight to position points based on factors including the compared signal characteristics, and means for determining the mobile device location by selecting one position point of the plurality of position points as a position point solution corresponding to the mobile device location based on the assigned weight wherein the position point solution is constrained by the classification of each position point.

Implementations of such an apparatus may include one or more of the following features. The classification of each position point may be as an interior position point or as an exterior position point based on the output of an interior-exterior classification algorithm. The interior-exterior classification algorithm may be a morphological operation function. The interior-exterior classification algorithm may be a multiple ray mechanism. The position point solution may be constrained by the classification of each position point by limiting the downloaded data to a particular position point classification. The downloaded data may be limited to interior classified position points. The position point solution may be constrained by the classification of each position point by assigning zero weight to each exterior classified position point. The apparatus may include means for determining transmitter identifying information from the received signals, means for downloading transmitter location information based on the transmitter identifying information, and means for estimating a mobile device position based at least in part on the transmitter location information. The downloaded data may correspond to a map tile associated with the estimated mobile device position. Selecting one position point as the mobile device location may include using a statistical measure of the weights assigned to the position points.

An example of a computer program product residing on a processor-readable non-transitory storage medium according to the disclosure may include processor-readable instructions executable by one or more processors to receive one or more signals from one or more transmitters, measure signal characteristics of the one or more received signals, download data from a database corresponding to a defined region associated with the transmitters wherein the downloaded data comprises a plurality of position points, a classification of each position point, and expected signal characteristics for each position point, compare the measured signal characteristics with the expected signal characteristics for each position point, assign a weight to position points based on factors including the compared signal characteristics, and determine the mobile device location by selecting one position point of the plurality of position points as a position point solution corresponding to the mobile device location based on the assigned weight wherein the position point solution is constrained by the classification of each position point.

Implementations of such a computer program product may include one or more of the following features. The classification of each position point may be as an interior position point or as an exterior position point based on the output of an interior-exterior classification algorithm. The interior-exterior classification algorithm may be a morphological operation function. The interior-exterior classification algorithm may be a multiple ray mechanism. The position point solution may be constrained by the classification of each position point by limiting the downloaded data to a particular position point classification. The downloaded data may be limited to interior classified position points. The position point solution may be constrained by the classification of each position point by assigning zero weight to each exterior classified position point. The computer program product may include processor readable instruction executable by one or more processors to determine transmitter identifying information from the received signals, download transmitter location information based on the transmitter identifying information, and estimate a mobile device position based at least in part on the transmitter location information. The downloaded data may correspond to a map tile associated with the estimated mobile device position. Selecting one position point as the mobile device location may include using a statistical measure of the weights assigned to the position points.

In accordance with implementations of the invention, one or more of the following capabilities may be provided. The characteristics of signals received from an access point can measured. The received signals can include access point identification information. The position of a mobile device can be estimated based on the identification information. Position points on a map of the defined area can be classified as interior or exterior position points by an interior-exterior classification algorithm. A set of position points and the expected received signal characteristics for each position point can be downloaded. Position points can be downloaded based on their classification. The deviation between the measured signal characteristics and the expected signal characteristics at the downloaded position points can be analyzed. A position point solution can be constrained by the position point classification. These and other capabilities of the invention, along with the invention itself, will be more fully understood after a review of the following figures, detailed description and claims. Other capabilities may be provided and not every implementation according to the disclosure must provide any, let alone all, of the capabilities discussed. Further it may be possible for an effect noted above to be achieved by means other than that noted and a noted item/technique may not necessarily yield the noted effect.

BRIEF DESCRIPTIONS OF THE DRAWINGS

In the appended figures, similar components and/or features may have the same reference label. Further, various components of the same type may be distinguished by following the reference label with a dash and a second label that distinguished among the similar components. If only the first reference label is used in the specification, the description is applicable to any one of the similar components having the same first reference label irrespective of the second reference label.

DETAILED DESCRIPTION

Embodiments of the invention provide techniques for automatically determining a location of a mobile device using hardware implemented algorithms which utilize constrained location solution positions. The techniques discussed below are examples, however, and not limiting of the invention as other implementations in accordance with the disclosure are possible. The described techniques may be implemented as a method, apparatus, or system and can be embodied in computer-readable media.

One or more signals from APs are received by a mobile device. The signals include information identifying the APs. AP location information is downloaded based on the AP identifying information. A mobile device position is estimated from the AP location information. Signal characteristics are measured for the received signals. A set of classified position point solutions for a map tile proximate to the estimated mobile device position is downloaded from a database associated with the defined region. Additionally, a classification of each position point solution as an interior or exterior point relative to the defined region is downloaded along with expected AP signal characteristics for each position point. A deviation between the measured AP signal characteristics and the expected AP signal characteristics is determined for each downloaded position point. A weight is assigned to each position point based on the deviation and based on the classification of the position point in order to generate a heat map for the map tile. A position point solution is constrained based on classification. By applying statistical measures to the heat map, one position point is automatically selected as the position point solution corresponding to the mobile device location.

Figure 1:
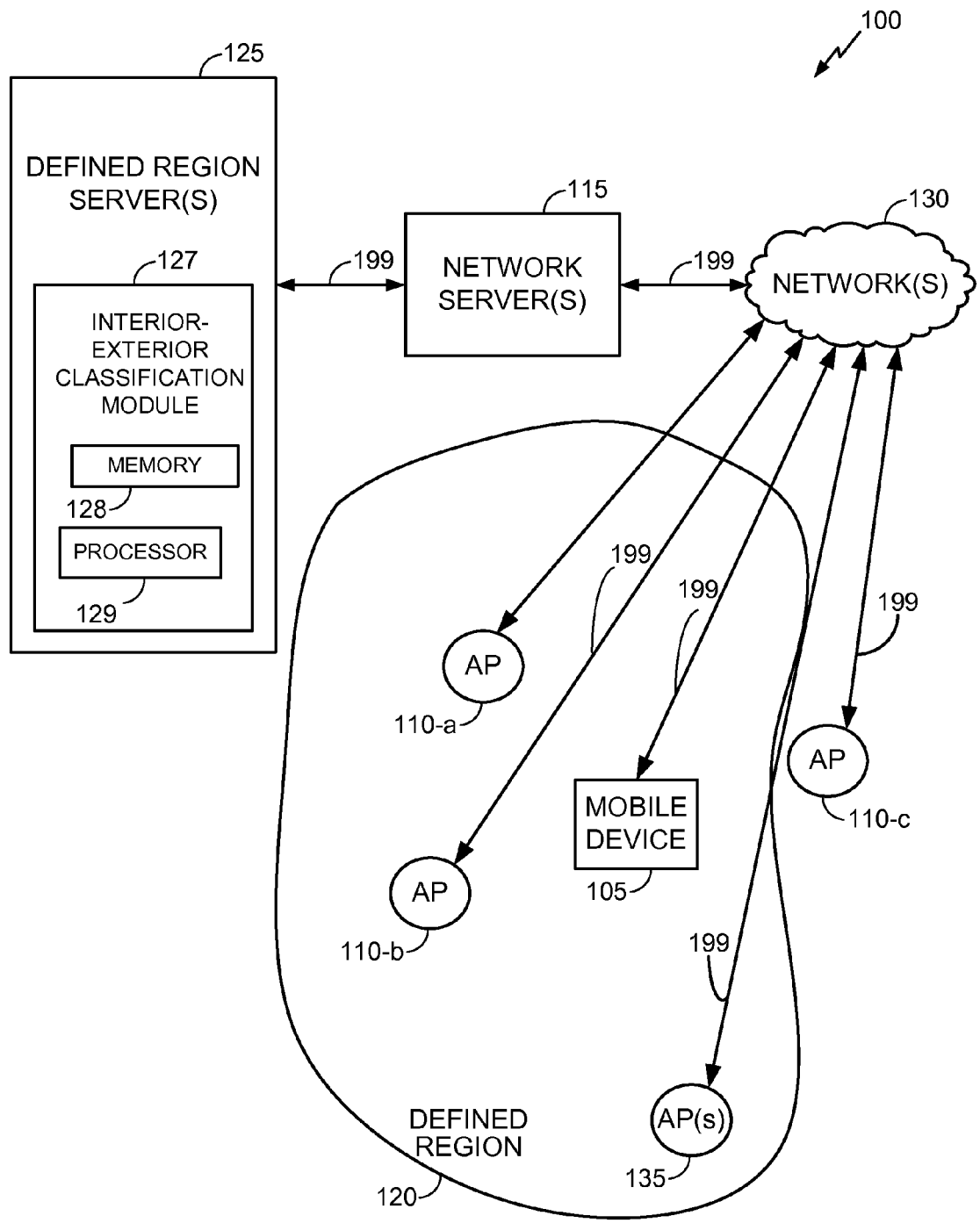
FIG. 1 is a diagram of system components for a mobile device positioning system.

Referring to FIG. 1, a system 100 for mobile device positioning is shown. The system 100 is an example and not limiting and may be altered, e.g., by having components added, removed, or rearranged. In an embodiment, the system 100 can include a mobile device 105, one or more network server(s) 115, network 130, a defined region 120, and one or more defined region server(s) 125. The system 100 can also include multiple APs, 110-*a*, 110-*b*, and 110-*c* (collectively sometimes referred to as APs 110) and multiple APs 135, located inside, outside, or on the perimeter of the defined region 120. In an example, the mobile device 105 can receive a measurable signal from the APs 110, but cannot receive a measurable signal from the multiple APs 135.

The system 100 may include multiple mobile devices 105 and multiple defined regions 120. Mobile device 105 is shown inside the defined region 120, by way of example, but may be located inside, outside, or on the perimeter of the defined region 120. The mobile device 105, APs 110, network 130, network server(s) 115, and defined region server(s) 125 are communicatively coupled via wired and/or wireless communication links 199.

The defined region 120 may be any region having a defined boundary. Examples of such defined regions can include, but are not limited to, schools, office buildings, stores, stadiums, arenas, convention centers, malls, a collection of buildings connected by tunnels, bridges, walkways, etc., airports, amusement parks, gardens, courtyards, parking lots, academic or business campuses, and any combinations or subsections thereof. The defined boundary may be physical, for example, a wall or fence, or the boundary may be a legal property line, or the boundary may be an arbitrary boundary defined with reference to a map or other representation of the region. For example, if the defined region 120 is a building, the exterior walls of the building can be the boundary of the defined region. In another example, if the defined region 120 is an amusement park, the boundary of the defined region 120 can be the perimeter of the amusement park as defined on a map or other representation of the amusement park area. In a further example, if the defined region 120 is a group of rides or attractions in an amusement park, the boundary of the defined region 120 can be the perimeter of an area including the entire group of rides or attractions.

The defined region 120 can be serviced by a wireless communication network 130 such as those exemplified above. GPS signals may be accessible within and proximate to the defined region 120, however, signals associated with the wireless communications network 130 may be preferable for location services. The GPS signals may be weak or inconsistent and therefore location services using the GPS signals may be inefficient and inaccurate. The defined region 120 may not have access to measurable GPS signals.

The number of APs 110 and 135 shown in FIG. 1 is an example and not limiting and may include a single AP 110 and/or 135 and any number of APs 110 and 135. In an embodiment, the mobile device may receive signals from all of the APs in a defined region so there may be no APs 135. The APs, which may be wireless APs (WAPs), may be any type of terrestrial radio transmitter used in conjunction with mobile device 105 and mobile network 130 including, for example, WiFi/WLAN APs, femtocell nodes or transceivers, pico cell nodes or transceivers, WiMAX node devices, beacons, WiFi base stations, Bluetooth transceivers, etc. Each AP may be a moveable node, or may be otherwise capable of being relocated.

Mobile device 105, APs 110 and 135, network server(s) 115, and defined region server(s) 125 represented in FIG. 1 may, for example, be enabled (e.g., via one or more network interfaces) for use with various communication network(s) 130 via wireless and/or wired communication links 199. Examples of such communication network(s) 130 include but are not limited to a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA)

network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMax, Ultra Mobile Broadband (UMB), and/or the like.

The mobile device 105 is intended to be representative of any electronic device that may be reasonably moved about by a user. Examples of the mobile device 105 may include, but are not limited to, a mobile station, a mobile phone, a smartphone, a user equipment, a netbook, a laptop computer, a tablet or slate computer, an entertainment appliance, a navigation device and any combination thereof. Additionally and/or alternatively, the mobile device may comprise any mobile device with wireless measurement capabilities. Claimed subject matter is not limited to any particular type, category, size, capability etc. of mobile device. The mobile device may be operatively associated with one or more cellular networks or the like.

The mobile device 105 can be associated with a defined region 120 due to reception of one or more signals transmitted by one or more APs 110 that are associated with the defined region 120.

Figure 2:
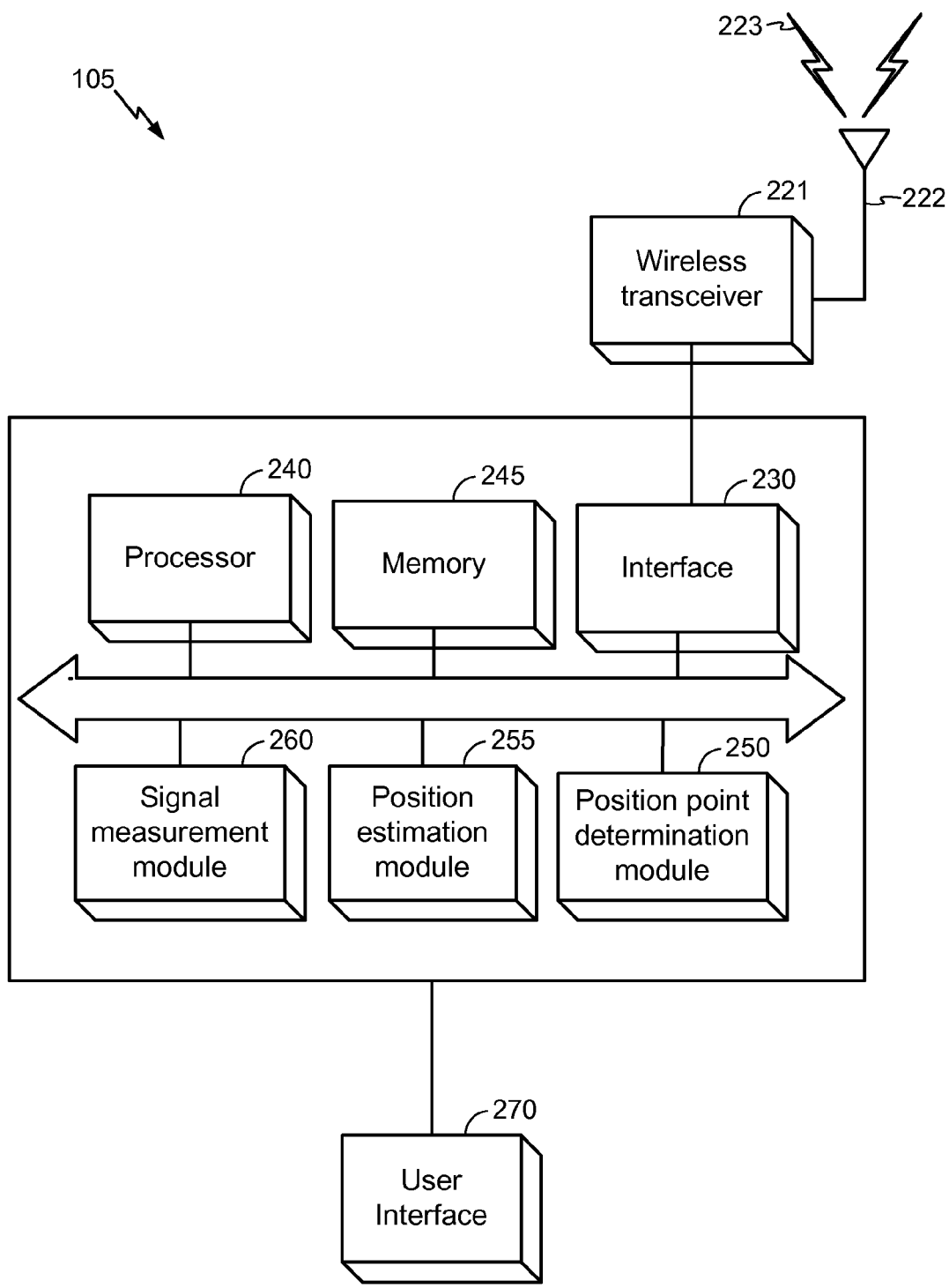
FIG. 2 is a diagram of components of a mobile device.

Components of an example of a mobile device 105 are illustrated in FIG. 2. The mobile device 105 includes a wireless transceiver 221 that sends and receives wireless signals 223 via a wireless antenna 222 over wireless network 130. The transceiver 221 is connected to a wireless transceiver interface 230. While shown as distinct components in FIG. 2, the wireless transceiver interface 230 may also be a part of the wireless transceiver 221. Here, the mobile device 105 is illustrated as having a single wireless transceiver 221. However, a mobile device 105 can alternatively have multiple wireless transceivers 221 and wireless antennas 222 to support multiple communication standards such as Wi-Fi, Code Division Multiple Access (CDMA), Wideband CDMA (WCDMA), Long Term Evolution (LTE), Bluetooth, etc.

Mobile device 105 further includes a user interface 270 that can include any type of display (not shown) and any type of user input device (not shown) including, for example, a keypad, a touchscreen, or a microphone.

In further reference to FIG. 2, a processor 240, memory 245, position point determination module 250, position estimation module 255, and signal measurement module 260, communicatively coupled to one another and to the interface 230, may be utilized to process the wireless signals 223 in whole or in part. While only one processor, one memory, and one of each module type are shown in FIG. 2, more than one of any of these components could be part of the mobile device 105. The position point determination module 250, position estimation module 255, and signal measurement module 260 are illustrated separately from the processor 240 for clarity but may be part of processor 240 or may be implemented in the processor 240 based on instructions in software stored in memory 245 and implemented by processor 240. It will be understood as used herein that the processor 240, position point determination module 250, position estimation module 255, and signal measurement module 260 can, but need not necessarily include, one or more microprocessors, embedded processors, controllers, application specific integrated circuits (ASICs), digital signal processors (DSPs) and the like. The term processor is intended to describe the functions implemented by the system rather than specific hardware.

Storage of information from the wireless signals 223 is performed using the memory 245. The memory 245 includes a non-transitory computer-readable storage medium (or media) that stores functions as one or more instructions or code. "Memory", as used herein, refers generally to any type of computer storage medium, including but not limited to RAM, ROM, FLASH, disc drives, etc. Memory 245 may be long term, short term, or other memory associated with the mobile device 105 and is not to be limited to any particular type of memory or number of memories, or type of media upon which memory is stored.

Functions stored by the memory 245 may be executed by the processor 240, position point determination module 250, position estimation module 255, and/or signal measurement module 260. Thus, the memory 245 is a processor-readable memory and/or a computer-readable memory that stores software code (programming code, instructions, etc.) configured to cause the processor 240, position point determination module 250, position estimation module 255, and signal measurement module 260 to perform the functions described. Alternatively, one or more functions of the mobile device 105 may be performed in whole or in part in hardware.

Referring again to FIG. 1, in an embodiment, when the mobile device is within or proximate to a defined region 120, the mobile device 105 can receive one or more signals from one or more APs 110 that are associated with the defined region 120. A database can exist on network server(s) 115 which can include a directory or list of AP MAC IDs, the location of particular APs based on the MAC IDs, and the identity of the defined area. For example, in a shopping mall, APs 110 may be located within the exterior walls of the mall and in the parking lot of the mall. The identity of the defined area, in this example, may be the name of the shopping mall. The received signals from the APs 110 can include information identifying the one or more APs transmitting the received one or more signals, for example, the MAC ID.

In particular embodiments, the mobile device 105 may transmit and/or receive information wirelessly to or from network server(s) 115 and/or APs 110 or may transmit and/or receive information partially or completely through a wired connection to network server(s) 115 and/or APs 110.

The defined region 120 may be serviced by one or more defined region server(s) 125. The defined region server(s) 125 can communicate with the network server(s) 115. The defined region server(s) 125 may be physically located in or near the defined region 120 or may be remotely located and may service one or more defined regions. The defined region server(s) 125 may be implemented in or may be the same as the network server(s) 115.

The defined region server(s) 125 may include an interior-exterior classification module 127. The interior-exterior classification module 127 may include a processor 129 and a memory 128. The processor 129 may be one or more microprocessors, embedded processors, controllers, application specific integrated circuits (ASICs), digital signal processors (DSPs) and the like. The term processor is intended to describe the functions implemented by the system rather than specific hardware. The memory 128 may be any non-transitory computer-readable storage medium (or media) that stores functions as one or more instructions or code including but not limited to RAM, ROM, FLASH, disc drives, etc. and is not to be limited to any particular type of memory or number of memories, or type of media upon which memory is stored. Any processor 129 and/or memory 128 used or associated with the interior-exterior classification module 127 may be used or associated with other functions of the defined region server(s) 125 and may not be hardware specifically or uniquely allocated for use by the interior-exterior classification module 127.

The processor 129 of the interior-exterior classification module 127 may execute an interior-exterior classification algorithm stored by the memory 128 of the interior-exterior classification module 127.

Figure 3:
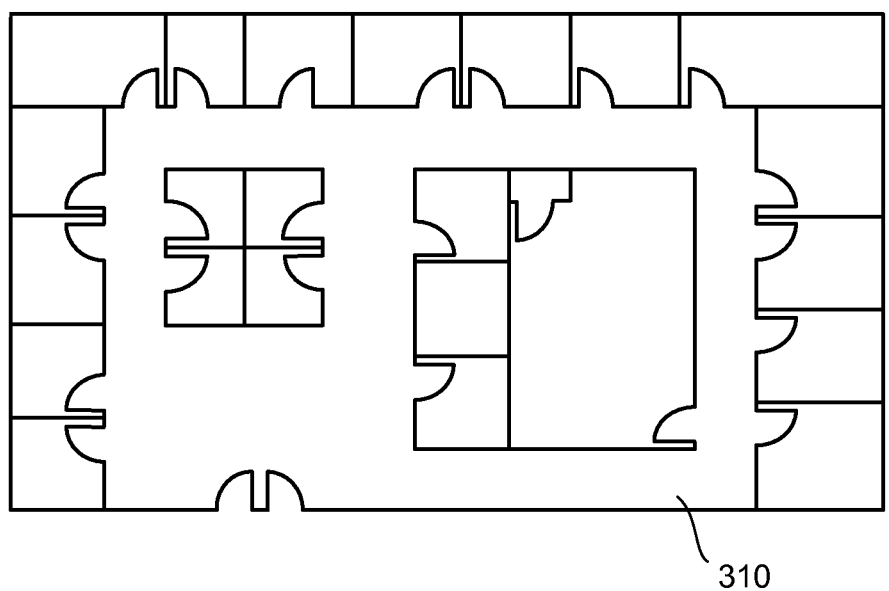
FIG. 3 is an example of mapping information.

Referring to FIG. 3, with further reference to FIG. 1, the interior-exterior classification module processor 129 may apply the particular interior-exterior classification algorithm to an example of mapping information 310 stored in memory 128. The mapping information 310 may represent the defined region 120 and the applied interior-exterior classification algorithm may classify position points associated with the mapping information 310 as interior or exterior position points. The classified position points may be stored in a database corresponding to the defined region in memory 128. The position points and respective classifications may be downloaded from the database in the interior-exterior classification module 127 by the mobile device 105 for use in mobile device location determination.

The interior-exterior classification algorithm may be, for example but not limited to, a multiple ray mechanism or a morphological operation function. In the case of a multiple ray mechanism, the position points can correspond to grid point positions, as will be discussed in more detail below. In the case of a morphological operation function, the position points can correspond to pixel positions, as will be discussed in more detail below. Interior or inside, as used herein as a position point classification, may not imply or represent locations including a roof or wall(s). Similarly, exterior or outside, as used herein as a position point classification may not imply or represent locations without physical structures such as a roof or wall(s). Interior and exterior can be designated by the output of the interior-exterior classification algorithm regardless of the presence or absence of physical structures.

Figure 4:
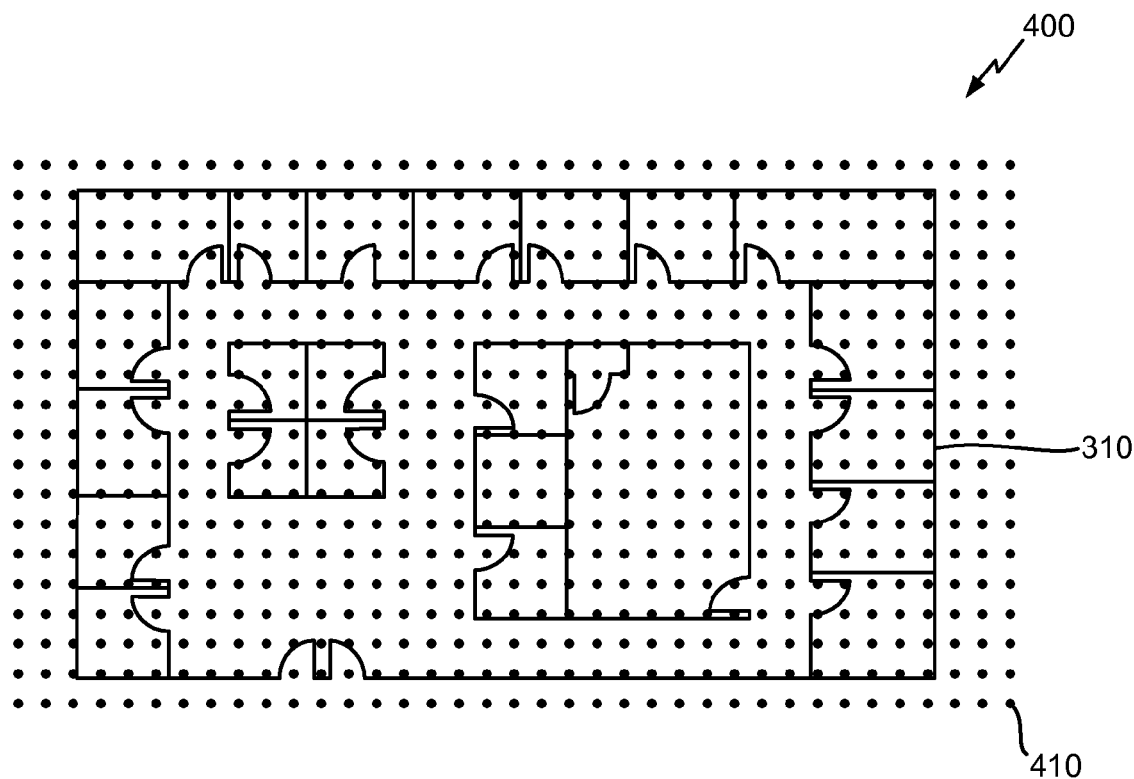
FIG. 4 is a schematic diagram of an infinite ray algorithm.
Figure 4:
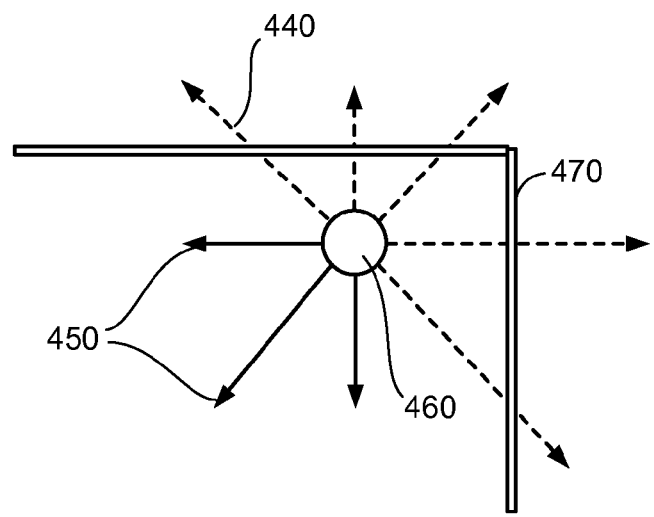

Referring to FIG. 4, with further reference to FIG. 1, a schematic diagram of a multiple ray mechanism 400 implemented by the interior-exterior classification module 127 is shown. A set of grid points 410 can be superimposed on a set of mapping information 310. The mapping information 310 may comprise any set of information that describes at least a portion of a defined region 120 and may include structural information. For example, the mapping information 310 may include a data file in various formats including, for example an image format, CAD format, DXF format, XML format, GML format, or some combination thereof, etc. The set of grid points 410 may be, by way of example but not limitation, a set of points that are located at regular intervals along at least two axes (e.g., an x-axis and a y-axis). Each grid point may have a third axis (e.g., a z axis) designation or the defined region may be discretized into separate levels along the third axis so that each set of points along two axes correspond to a particular level along a third axis. The levels along the third axis may correspond, for example, to different floors of a building.

According to the multiple ray mechanism, each individual grid point 460 of the set of grid points 410 can be classified as an interior grid point or as an exterior grid point by projecting some number of rays 440 outwards at angular intervals 450 from each individual grid point 460. Although eight rays 440 are shown in FIG. 4, this is by way of example only. Such a mechanism 400 may include more or fewer rays 440. Similarly, the angle of separation 450 as shown in FIG. 4 is an example and may vary with the number of rays 440 to maintain equality between any two proximate rays 440 and, furthermore, the angle of separation 450 may not be equal between any two or more pairs of rays 440. For certain example implementations, a determination as to whether a grid point 460 corresponds to an interior position point or an exterior position point may be based at least partly on a number of impact(s) made by rays 440. For example, a number of impacts may be compared to a predetermined threshold. If a number of impacts made by projected rays 440 from a given point 460 equals or exceeds a predetermined threshold, such a given point 460 may be determined to correspond to an interior position point. Alternatively but equivalently, the given point 460 may be determined to correspond to an exterior position point if a number of impacts made by projected rays 440 from the given point 460 is less than a predetermined threshold.

Figure 5:
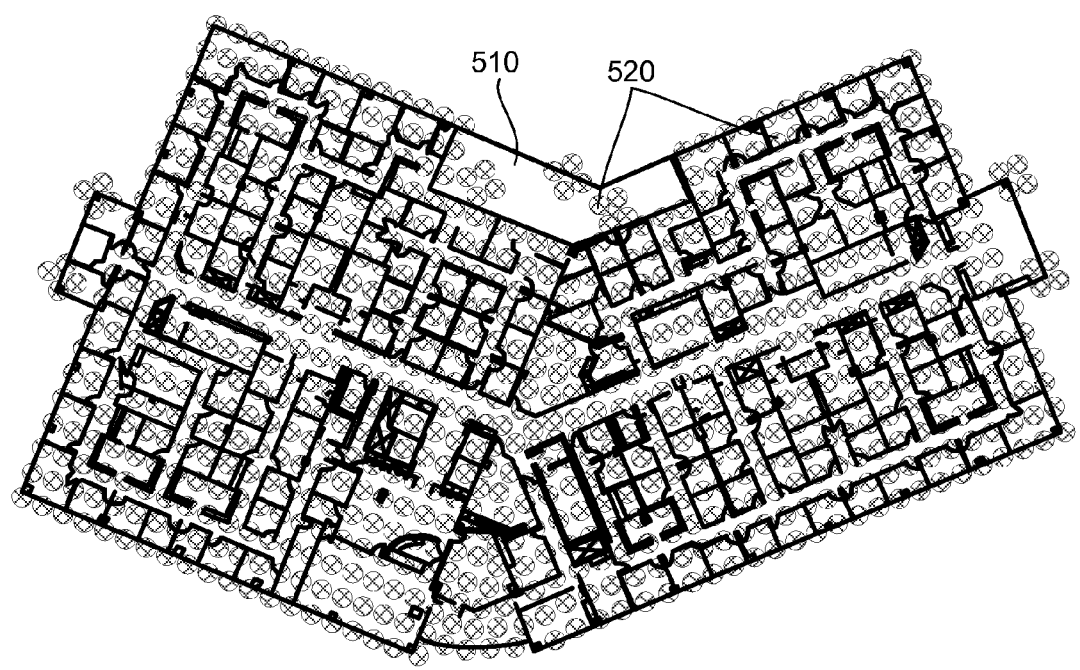
FIG. 5 is an example of a graphic result of an infinite ray algorithm for image point classification.

Referring to FIG. 5 with further reference to FIGS. 3 and 4, an example of results from a multiple ray mechanism are shown. The areas 520 covered with cross-hair filled circles include all of the grid point positions 410 classified as interior position points. The white areas 510 include all of the grid point positions classified as exterior position points. As shown in FIG. 5, the classification of a grid point position as interior or exterior may not match the physical location of the grid point position with respect to structural boundaries such as exterior walls. The designation or classification of a particular position point as interior or exterior can be the interior-exterior classification algorithm output as opposed to a physical position of the particular location with regard to the defined region 120. The grid point positions and respective classifications are stored by memory 128 for download and use by the mobile device 105 in determining a position point solution.

Figure 6:
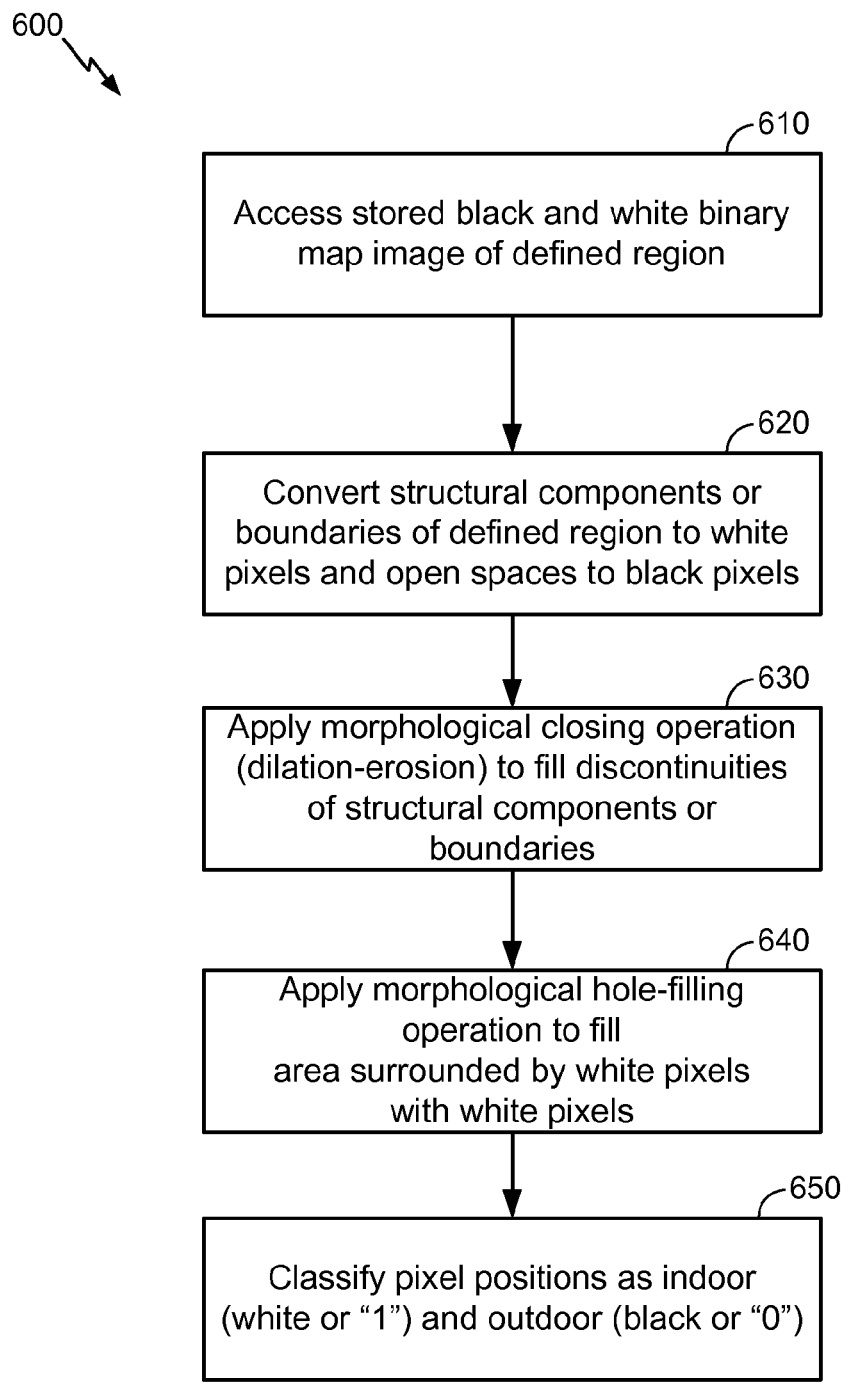
FIG. 6 is a flow diagram of a morphological operation function process for image point classification.
Figure 7:
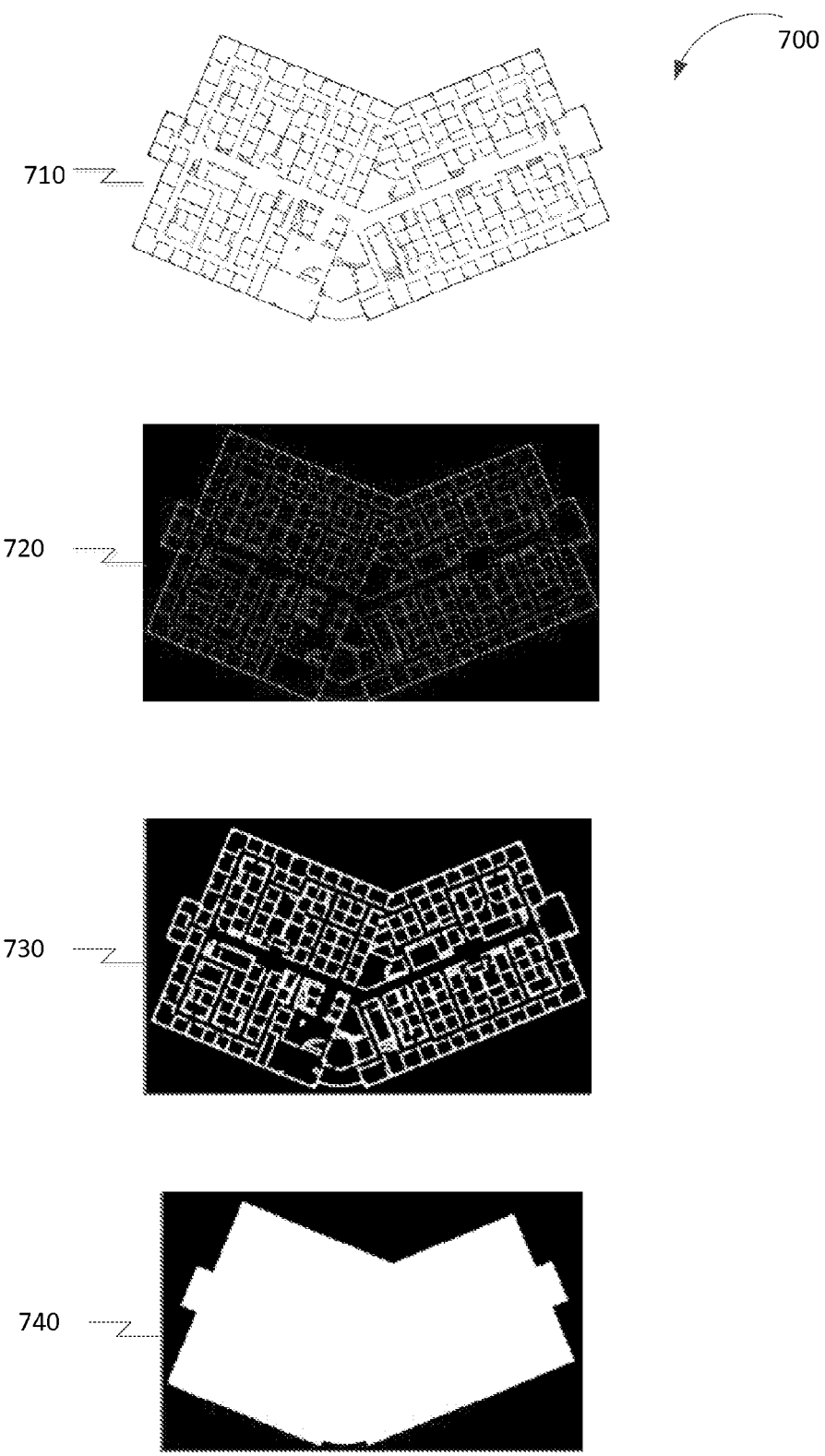
FIG. 7 is examples of images produced by a morphological operation function.

Referring to FIGS. 6 and 7 with further reference to FIG. 1, a morphological operation function process 600 of classifying position points as interior or exterior position points using the interior-exterior classification module includes the stages shown. The process 600 is, however, an example only, and not limiting. The process 600 can be altered, e.g., by having stages added, removed, rearranged, combined, and/or performed concurrently.

At stage 610, a black and white binary image, for example image 710 in FIG. 7, stored in memory 128 and corresponding to the mapping information 310 for the defined region 120, is accessed by the processor 129. The black and white binary image 710 may include a data file in an image format. Image formats may be acquired from a website, a camera, or a mobile device including a camera taking a picture of a displayed map, scanning a printed map, copying an image presented on the internet and so forth, just to name a few examples.

The binary image 710 may include pixels designated by at least two coordinates, for example an x and y coordinate along two axes, x and y. The pixels can correspond to position points. Each pixel may have a third axis (e.g., a z axis) designation or the defined region may be discretized into separate levels along the third axis so that each set of pixels along two axes correspond to a particular level along a third axis. The levels may correspond, for example, to different floors of a building.

At stage 620, as exemplified in binary map image 720, structural components of the binary map image 710 are converted to white pixels and open spaces are converted to black pixels by the processor 129. Structural components, for example, can include exterior walls, interior walls, doors, doorways, stairwells, elevator shafts, and windows. Open spaces, for example, can include rooms, hallways, stairs, elevator car space, courtyards, and exterior features such as gardens or walkways. Open spaces can be bounded on one or more sides by structural components.

At stage 630, a morphological closing operation is applied to the binary map image 720 by the processor 129. The morphological closing operation can include a dilation operation followed by an erosion operation to determine an output value for each pixel in the binary map image 720.

In an example of a morphological closing operation implementation, black binary map image pixels can be associated with a logic value of "0" and white binary map image pixels can be associated with a logic value of "1". A particular pixel in binary map image 720 can be a target pixel, or pixel of interest for an iteration of the morphological closing operation. A neighborhood for each target pixel in the binary map image 720 can be defined as the pixels bordering the target pixel. The number and arrangement of pixels in a neighborhood may vary based on the complexity of shapes on the binary map image. As an example, for a substantially rectangular shape, the target pixel may have a neighborhood of eight pixels, i.e. top, bottom, left, right, diagonal top right, diagonal top left, diagonal bottom right, and diagonal bottom left. For target pixels at the edge of an image, parts of the neighborhood can extend past the border of the image to encompass undefined pixels. A logic value of "1" or "0" may be assigned to the undefined pixels for a dilation operation or an erosion operation as described in more detail below.

The dilation operation can operate, in turn, on each pixel, for example in binary map image 720, such that as the morphological dilation operation steps through the pixels in binary map image 720, each pixel, in turn, can be the target pixel. As a result of the dilation operation, the output value of the target pixel can be the maximum value of all of the pixels in the neighborhood of the target pixel. For example, if any of the pixels in the neighborhood of the target pixel has a logic value of "1" (i.e. a white pixel), the output value of the target pixel can be logic value of "1" (i.e. a white pixel). For border pixels, in the morphological dilation operation, undefined pixels beyond the border of the image can be assigned to a logic value of "0". This morphological dilation operation can cause the white areas to expand and thereby fill imaging discontinuities in physically continuous structural components to remove the imaging discontinuities.

Following the dilation operation and in a manner similar to the dilation operation, an erosion operation can be applied to each pixel, in turn, of the binary map image to complete the morphological closing operation. An erosion operation can remove feature distortions typically produced during the expansion of the white areas during the dilation operation. As a result of the erosion operation, the output value of the target pixel can be the minimum value of all of the pixels in the neighborhood of the target pixel. For example, if any of the pixels in the neighborhood of the target pixel has a logic value of "0" (i.e. a black pixel), the output value of the target pixel can be a logic value of "0" (i.e. a black pixel). For border pixels, in the erosion operation, undefined pixels beyond the border of the image can be assigned to a logic value of "1". An example of an image with imaging discontinuities removed by a morphological closing operation including a distortion operation followed by an erosion operation is shown in binary map image 730 of FIG. 7.

At stage 640, a morphological hole-filling operation is performed by the processor 129 on the binary map image that can be produced by the morphological dilation operation, for example binary map image 730. The morphological hole-filling operation can convert to white pixels the clusters of black pixels that are completely surrounded, or bounded, by connected, or adjoining, white pixels (i.e. pixels adjoined along a pixel edge, for example, top, bottom, left, or right edges). The surrounded clusters of black pixels can be defined as holes. Image 740 in FIG. 7 can be an example of a result of the morphological hole-filling operation. As a result of the morphological hole-filling operation, all of the binary map image pixels within the defined boundary of the defined region 120 can correspond to a logic value of "1" or a white pixel.

At stage 650, pixel positions are classified by the processor 129 as interior position points or exterior position points. White pixels, which can correspond to a digital logic value of "1", can be classified as interior pixel position points. Black pixels, which can correspond to a digital logic value of "0", can be classified as exterior pixel position points. The pixel point positions and respective classifications are stored by memory 128 for download and use by the mobile device 105 in determining a position point solution.

Referring again to FIGS. 1 and 2, mobile device 105 can determine a position point solution constrained at least in part by the position point classifications from the above described interior-exterior classification algorithms. The classified position points may depend on the particular interior-exterior classification algorithm. For example, for a multiple ray mechanism, the position points correspond to grid point positions and, for a morphological operation function, the position points correspond to pixel positions. A particular criteria or filter can utilize the position point classifications to constrain the position point solution. Constraining the location determination solution can provide various benefits including, for example, reduction in computing time for at least the mobile device 105, reduction in the amount of downloaded data to reduce consumed bandwidth, increased battery life, and increased location determination speed and accuracy.

The solution constraint may depend on the location and/or navigation application operating in the mobile device 105. For example, in the case of an indoor navigation application, such as an application used to route a user to a particular store in a shopping mall, the position point solution may be constrained to interior classified position points. As another example, in the case of an interior-exterior navigation application, such as an application used to route a user from inside a shopping mall to a location in a parking lot, the solution may be constrained to a certain combination of interior and exterior position points. In various particular embodiments, the location and/or navigation application operating in the mobile device can be determined automatically by the mobile device 105 or can be determined by user input via the user interface 270.

The solution constraint may disallow mobile device location solutions that may be indicated by calculations and measurements based on signal characteristics or AP positions. For example, even if signal analysis such as triangulation or fingerprinting, may locate a mobile device outside of the defined region 120, if the applied solution constraint limits the possible position point solutions to interior classified position points, then the determined position point solution can correspond only to an interior classified position despite the signal analysis location determination. Indeed, the determined position point solution may not correspond to the physical position of the mobile device 105. For example, if the position point solution is constrained to interior classified position points and the mobile device 105 is moving along a path just outside of the defined area 120, the position point solutions over time can show the mobile device 105 moving along a path just inside of the defined area 120. In this manner, the constraint can be said to push the position point solution from the actual physical location of the mobile device 105 to the nearest possible position point solution allowed by the constraint.

The constraint on the position point solution may exclude position points that may be accessible to AP signals but may be impossible or highly unlikely position point solutions. For example, a mobile device location based on signal analysis without a classification constraint may locate a mobile device in a marsh, swamp, lake or other inaccessible region adjacent to a defined region 120. By constraining the position point solution to exclude position points determined to be inaccessible, unlikely, or otherwise undesirable, accuracy can be improved and location computation time can be decreased preserving both bandwidth and battery life.

As shown in FIGS. 1 and 2, the antenna 222 and transceiver 221 of mobile device 105 may receive AP signals 223 from APs 110. The APs 110 can be located inside the defined region 120, for example at various positions within a building, stadium, or amusement park. APs 110 may also be located in areas outside of the defined region 120, but affiliated with the defined region 120, for example, in a parking lot or garden. When the mobile device 105 can receive a measurable signal from one or more APs 110 associated with the defined region 120, the mobile device 105 may use the AP signals for position determination. The mobile device 105 may use the AP signals in place of or in combination with GPS signals. In or near a defined region with weak or insufficient GPS signals, using the AP signals may be more efficient and accurate.

The processor 240 may determine AP identifying information from the signals 223 received by the antenna 222 and transceiver 221 and sent to the processor 240 via the interface 230. The identifying information may include, for example, one or more MAC IDs for one or more signals received by the mobile device 105 from one or more APs 110. Via the interface 230, transceiver 221, and antenna 222, the mobile device may send the identifying information to the network server(s) 115 via the network 130.

In response to sending the identifying information, the processor (240) of mobile device 105 may download, from the network server(s) 115, AP locations and an identity of the defined region based on the AP MAC IDs. One or more databases may exist on network server(s) 115 and/or defined region server(s) 125 including a directory or list of MAC IDs and the corresponding AP location and defined region identity. For example, if the APs from which the mobile device received signals are located in a shopping mall, the mobile device can download the locations of the APs in the shopping mall and also download the name of the shopping mall. The AP locations may be in the form of local coordinates and/or global coordinates.

In an embodiment, the mobile device 105 may identify a defined region 120 based on a currently determined GPS location or a GPS location stored in memory 245 or at the network server(s) 115. The current or stored GPS location may be sent alone or together with the received MAC IDs to the network server(s) 115. The mobile device 105 may download, from the network server(s) 115, a defined region identity based on the GPS location or the GPS location along with the determined MAC IDs.

The downloaded AP location and defined region identity may be stored in memory 245. The defined region identity may be available to a user via the user interface 270.

The position estimation module 255 may estimate an initial mobile device position or location based on the downloaded AP locations. In an embodiment, this initial mobile device position may be estimated as a centroid of the downloaded AP locations. In a particular embodiment, this initial mobile device position may be estimated as a weighted centroid of the downloaded AP locations. For example, the weighting factor may be the received signal strength indicator (RSSI), the round trip time (RTT), angle of arrival, variance or standard deviation of RSSI, and variance or standard deviation of RTT or any other signal characteristic measured by the mobile device 105. In an embodiment, the initial mobile device position may be estimated based on a prior estimated or determined mobile device position and a known or estimated speed and direction of movement of the mobile device 105. The estimated mobile device position may be stored in memory 245 and may be available to a user via the user interface 270.

The mobile device 105 may send the estimated mobile device position to the network servers) 115 and/or the defined region servers) 125 in order to download an appropriate map tile from the defined region servers) 125. The appropriate map tile can be a map tile which includes position points proximate to the estimated mobile device position. In an embodiment, the processor 129 of the interior-exterior classification module can divide the set of possible position points encompassing the entire defined region into map tiles. These map tiles may be any shape, size, and quantity and each map tile may be of a different shape and size than any other map tile. In an implementation, the entire set of position points associated with a defined region 120 may be contained in a single map tile. In an embodiment, the position points included in a map tile may correspond to a particular position point classification. For example, the map tile may only include interior classified points or may only include exterior classified points. The size of a map tile can depend on mobile device and/or network parameters. Examples of parameters are the mobile device memory, the speed or data rate of the network, the download speed, the speed of mobile device motion, and the network bandwidth. In various embodiments, the map tile may be a square with a default edge length of 50 m or of 100 m.

Using the signals 223 received from APs 110, the signal measurement module 260 may measure received signal characteristics. These signal characteristics may include, for example, RSSI, RTT, angle of arrival, variance or standard deviation of RSSI, and variance or standard deviation of RTT. The measured signal characteristics may be stored in memory 245.

The position point determination module 250 of the mobile device 105 may download, from a database corresponding to the defined region 120 on the network server(s) 115 and/or defined region server(s) 125, a map tile of classified possible position points.

The possible position points can be classified as interior or exterior by an interior-exterior classification algorithm implemented in the interior-exterior classification module 127, as described above. The position point module 250 may download, from the interior-exterior classification module 127, the classification of each position point along with the position point. In an embodiment, the position point module 250 may selectively download map tiles including position points limited to a particular classification. For example, the position point module 250 may only download map tiles including position points limited to interior classified points or may only download map tiles including position points limited to exterior classified points.

The position point determination module 250 may download expected AP signal characteristics for each downloaded position point in the map tile. In various embodiments, expected AP signal characteristics can be determined for each position point based on calculated, or modeled, signals or based on signals measured during signal sampling of the defined region and stored in a database. The signal characteristics include, for example, received signal strength indicator (RSSI), round trip time (RTT), angle of arrival, variance or standard deviation of RSSI, and variance or standard deviation of RTT. For each position point, there can be an expected value for the signal from a particular AP 110a, b, or c. The overall expected value for a position point can be a vector with N components, where N is the number of APs whose signal is expected to reach a particular position point. Each component of the vector can be the expected value for signal from a particular AP 110a, b, or c.

In an embodiment, the expected values for each position point can be generated prior to determining the location of the mobile device 105. The expected values can be stored in a database on one or more servers, including the network server(s) 115 and defined region server(s) 125.

The position point determination module 250 can compare measured AP signal characteristics, as determined by the signal measurement module 260, with the downloaded expected AP signal characteristics for each downloaded position point to determine a deviation. The deviation can be the difference between the measured signal characteristics and the expected signal characteristics. More accurate expected signal characteristics can result in a smaller deviation between expected and measured signal characteristics. The accuracy of the expected signal characteristics can depend on the models or measurement methods used to determine the expected characteristics.

The position point determination module 250 can assign a weight to each downloaded position point based on the deviation and/or the classification of the position point. A larger deviation between the measured AP signal characteristics and the expected AP signal characteristics can result in a lower weight value. Conversely, a smaller deviation between the measured AP signal characteristics and the expected AP signal characteristics can result in a higher weight value. The weights can correspond to a probability that the mobile device 105 is located at a particular position point. In an embodiment, the position point determination module can assign a zero weight to position points based on the position point classification and irrespective of the deviation.

For a map tile, which may encompass all or part of the defined region, the position point determination module 250 may generate a likelihood heat map or utility map which includes the assigned weight for each position point included in the map tile. A likelihood heat map for a map tile may indicate respective likelihood values or weights for respective position points included in the map tile. Likelihood values of a likelihood heat map may indicate relative likelihoods that the mobile device 105 is positioned at one point as compared to other points in the map tile. In an example of a three-dimensional graphical representation, higher weights in the heat map can form a bulge in the heat map which may be a single bulge or a bimodal bulge or another shape corresponding to the relative weights assigned to the position. In a particular embodiment, the heat map can be non-graphically represented by data in a database.

The position point determination module 250 can automatically select one downloaded position point as the mobile device location by applying statistical measures to the likelihood heat map. The statistical measures may include methods of particle filtering. In various implementations, the position of the mobile device 105 can correspond to a centroid, a center of mass, a maximum weight, a particular peak of a bimodal distribution, or other position point chosen by an appropriate statistical measure as determined by the form of the weight distribution. In a particular implementation, the selected mobile device location position may be within less than or equal to 10 m of the physical position of the mobile device 105. In various embodiments, the automatically selected mobile device location may be within 1-2 m 3-5 m, or 6-7 m of the physical position of the mobile device. The accuracy of the selected mobile device location may depend on the particular classification constraint and the number of AP signals 223 available to the mobile device 105.

In an implementation, the mobile device location automatically determined by the position point determination module 250 may be available to a user via the user interface 270. The location may also be stored in memory 245 or sent to the network server(s) 115 and or defined area server(s) 125. The mobile device location may be used by the processor 240 for various applications, for example but not limited to, navigation applications, available to the mobile device 105.

Figure 8:
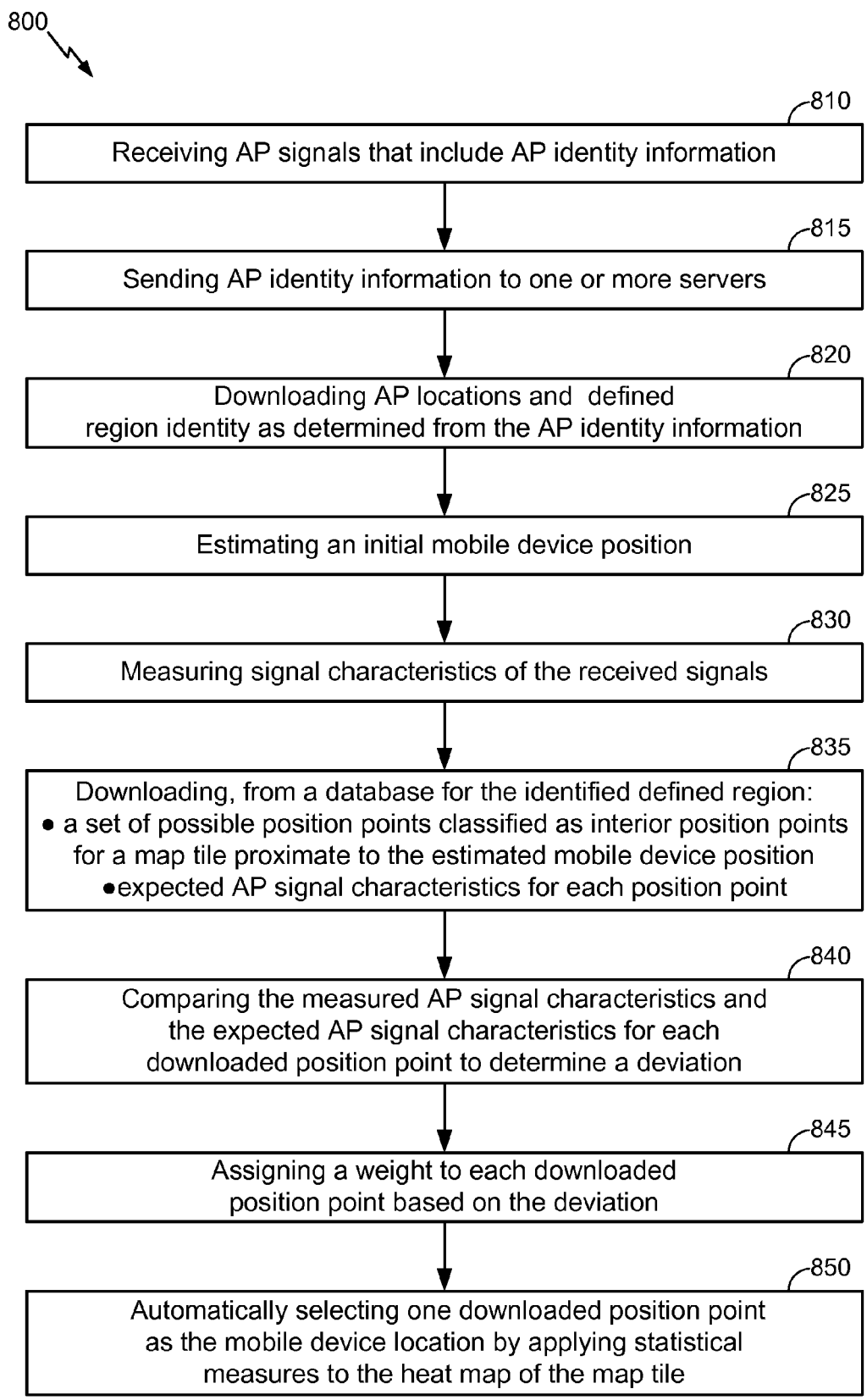
FIG. 8 is a flow diagram of a process for mobile device positioning utilizing a downloading filter.

In operation, referring to FIG. 8, with further reference to FIGS. 1 and 2, a mobile device positioning method 800 using the system 100 and mobile device 105 includes the stages shown. The method 800, however, is by way of example only and not limiting. The method 800 may be altered, e.g., by having stages added, removed, rearranged, combined, and/or performed concurrently.

Method 800 along with methods 900 and 1000, as described below with regard to FIGS. 9 and 10 respectively, encompass various embodiments of a mobile device positioning method based on constrained position solutions. These embodiments are by way of example only and not limiting. In these various embodiments, position point constraint may be realized by a downloading filter, as described by FIG. 8, by a weighting filter, as described by FIG. 9, or by an expected value filter, as described by FIG. 10, or by any combinations thereof.

At stage 810, one or more signals 223 that include AP identity information are received from APs 110 by the antenna 222 and wireless transceiver 221 of mobile device 105. The AP identifying information, for example, one or more MAC IDs, is determined by the processor 240 from the one or more signals 223 received by the mobile device 105.

At stage 815, the AP identifying information is sent to the network server(s) 115 by the wireless transceiver 221 of mobile device 105.

At stage 820, AP locations and an identity of the defined region 120, as determined from the AP MAC IDs sent to the network server(s) 115, are downloaded by the processor 240 of mobile device 105 from the network server(s) 115 and/or the defined region server(s) 125. The downloaded AP locations and defined region identity may be stored in the memory 245 for use by the processor 240, the position estimation module 255 and/or any of the other modules of the mobile device 105. The defined region identity may be available to a user via the user interface 270.

In an embodiment, a defined region 120 may be identified based on a currently determined GPS location currently determined by the mobile device 105 or based on a GPS location stored in memory 245 or at the network server(s) 115. A current or stored GPS location may be sent by the mobile device 105, either alone or together with the received MAC IDs, to the network server(s) 115. The defined region identity, based on the current or stored GPS location, may be downloaded by the mobile device 105 from the network server(s) 115.

At stage 825, an initial mobile device position is estimated by the position estimation module 255 of the mobile device 105. In an embodiment, this initial mobile device position may be estimated as a centroid of the downloaded AP locations. In a particular embodiment, this initial mobile device position may be estimated as a weighted centroid of the downloaded AP locations. For example, the weighting factor may be the received signal strength indicator (RSSI), the round trip time (RTT), angle of arrival, variance or standard deviation of RSSI, and variance or standard deviation of RTT or any other signal characteristic measured by the mobile device. In an embodiment, the mobile device position may be estimated based on a prior estimated or determined mobile device position and a known or estimated speed and direction of movement of the mobile device. The estimated mobile device position may be stored in memory 245 and may be available to a user via the user interface 270.

In an embodiment, at stage 825, a map tile, as described above, may be defined by the processor 129 of interior-exterior classification module 127 using the estimated mobile device position sent to the network servers) 115 and/or the defined region servers) 125.

At stage 830, received signal characteristics are measured by the signal measurement module 260. These signal characteristics may include, for example, RSSI, RTT, angle of arrival, variance or standard deviation of RSSI, and variance or standard deviation of RTT.

At stage 835, a map tile limited to interior classified possible position points is downloaded, by the position point determination module 250, from a database corresponding to the identified defined region 120. The position points can be classified as interior by an interior-exterior classification algorithm, as described above. The classification algorithm and the database may reside in the interior-exterior classification module 127 of the defined region servers) 125. The map tile may be a set of position points proximate to the estimated mobile device position, as discussed above.

Limiting the downloaded set of position points to interior classified position points can serve as a downloading filter. In the embodiment of method 800, based on the location and/or navigation application operating in the processor 240 of mobile device 105, the position point determination module 250 may request and download only interior classified position points and, therefore, the location determination solution can be constrained to interior classified position points. As a result, the mobile device location can be determined to be at an interior classified position point even if the mobile device is physically located at an exterior classified position point or at an unclassified location inside or outside of the defined region.

In an embodiment, the downloading filter may be used in conjunction with an indoor-outdoor transition application operating in the processor 240 of mobile device 105. The indoor-outdoor transition application may use AP signals and GPS signals to automatically determine if the mobile device 105 is inside or outside of a defined region based on signal analysis and/or AP or beacon locations. For example, once the indoor-outdoor transition application determines that the mobile device is inside a defined region 120, method 800 may be used to constrain the position solution to interior position points.

At stage 835, expected AP signal characteristics, as described above, are downloaded by the position point determination module 250 for each downloaded position point.

At stage 840, the measured AP signal characteristics from the signal measurement module 260 and the downloaded expected AP signal characteristics are compared by the position point determination module 250 for each downloaded position to determine a deviation of the measured signal characteristics from the expected signal characteristics. The deviation can be the difference between the measured signal characteristics and the expected signal characteristics.

At stage 845, a weight is assigned by the position point determination module 250 to each downloaded position point based on the deviation. A larger deviation between the measured AP signal characteristics and the expected AP signal characteristics can result in a lower weight value. Conversely, a smaller deviation between the measured AP signal characteristics and the expected AP signal characteristics can result in a higher weight value. The weights can correspond to a probability that the mobile device 105 is located at a particular position point.

For a map tile, which may encompass all or part of the defined region, a likelihood heat map or utility map which includes the assigned weight for each position point included in the map tile may be generated by the position point determination module 250. A likelihood heat map for a map tile may indicate respective likelihood values or weights for respective position points included in the map tile. Likelihood values of a likelihood heat map may indicate relative likelihoods that the mobile device 105 is positioned at one point as compared to other points in the map tile. In a graphical representation, for example, higher weights in the heat map can form a bulge which may be a single bulge, a bimodal bulge, or another shape corresponding to the relative weights assigned to the position. In a particular embodiment, the heat map can be non-graphically represented by data in a database.

At stage 850, one downloaded position point is automatically selected as the mobile device location by the position point determination module 250 by applying statistical measures to the likelihood heat map. The statistical measures may include methods of particle filtering. In various implementations, the position of the mobile device 105 can correspond to a centroid, a center of mass, a maximum weight, a particular peak of a bimodal distribution or other point chosen by an appropriate statistical measure as determined by the form of the weight distribution. In a particular implementation, the selected mobile device location may be within less than or equal to 10 m of the physical position of the mobile device. In various embodiments, the selected mobile device location may be within 1-2 m, 3-5 m, or 6-7 m of the physical position of the mobile device. The accuracy of the selected mobile device location position may depend on the classification constraint and the number of AP signals available to the mobile device.

In an implementation, at stage 850, the mobile device location automatically determined by the position point determination module 250 may be displayed or otherwise made available to a user via the user interface 270. The location may also be stored in memory 245 or sent to the network server(s) 115 and/or defined area server(s) 115. The mobile device location may be used by the processor 240 for various applications, for example but not limited to, navigation applications, available to the mobile device 105.

In an alternative implementation of process 800, at stage 835, a map tile limited to exterior classified position points is downloaded from a database corresponding to the defined region 105. Limiting the downloaded set of position points to exterior classified position points can serve as a downloading filter. Based on the location and/or navigation application operating in the processor 240 of mobile device 105, the position point determination module 250 may request and download only exterior classified position points and, therefore, the location determination solution can be constrained to exterior classified position points. As a result, the mobile device location can be determined to be at an exterior classified position point even if the mobile device is physically located at an interior classified position point or at an unclassified location inside or outside of the defined region.

The exterior only downloading filter described above may be used in conjunction with an indoor-outdoor transition application running in processor 240 of mobile device 105. The indoor-outdoor transition application may use AP signals and GPS signals to automatically determine if the mobile device 105 is inside or outside of a defined region based on signal analysis and/or AP or beacon locations. For example, once the indoor-outdoor transition application determines that the mobile device 105 is outside of a defined region 120, an embodiment of method 800 may be used to constrain the position solution to exterior position points.

The exterior only downloading filter may be applicable, for example, to a mobile device 105 with access to AP signals and limited or no access to GPS signals and located in a parking lot, courtyard, or garden associated with a defined region. The APs 110 may be located inside and/or outside of the defined region 120 and may have signals accessible to mobile devices outside the defined region 120. Alternatively, the exterior only downloading filter may be applicable, for example, to a mobile device with access to AP signals and access to GPS signals. In an embodiment, AP signals and GPS signals may be used in combination to locate a mobile device at, for example, exterior classified points.

Figure 9:
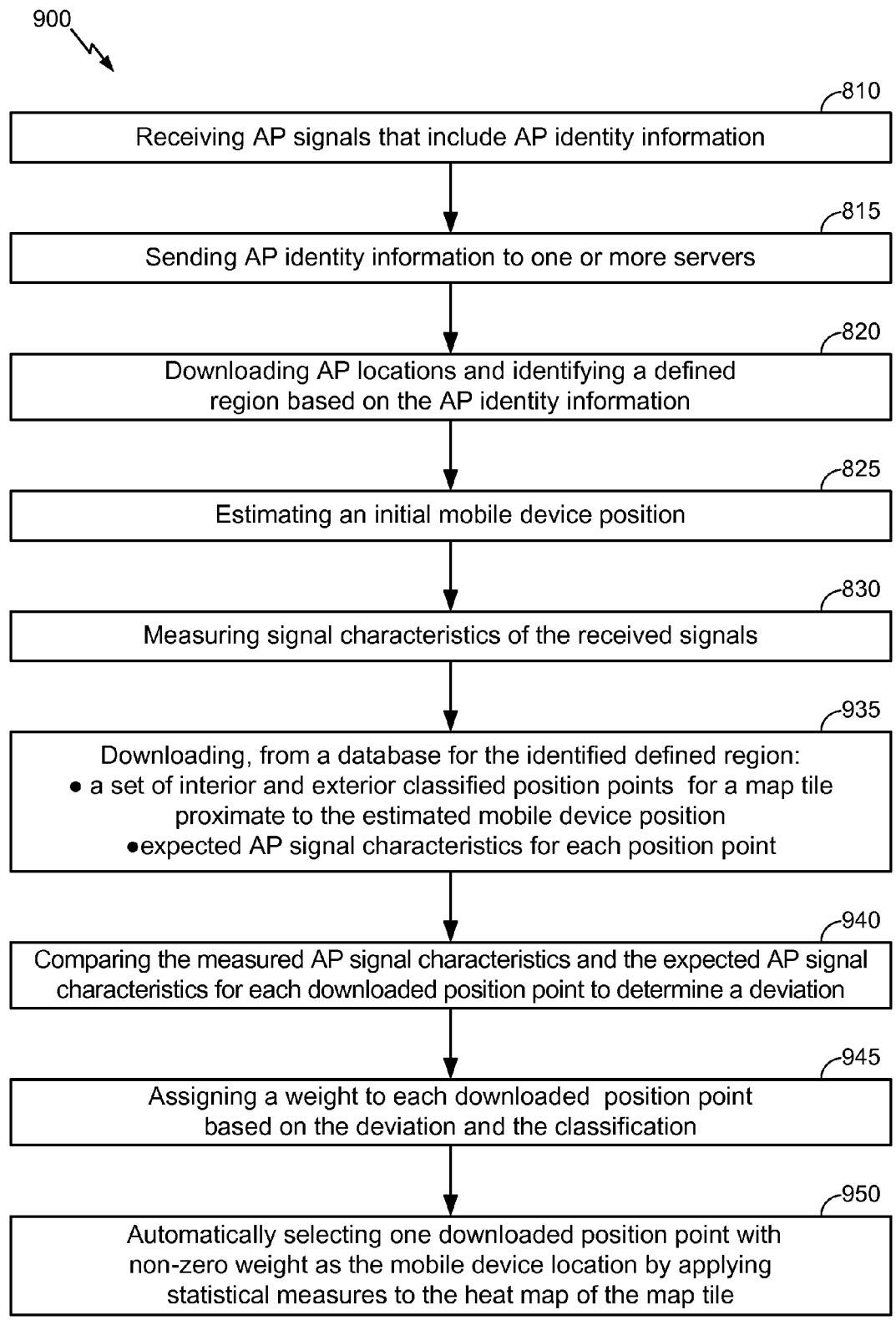
FIG. 9 is a flow diagram of a process for mobile device positioning utilizing a weighting filter.

Referring to FIG. 9, with further reference to FIGS. 1 and 2, a method 900 using the system 100 and mobile device 105 includes the stages shown. The method 900 is by way of example only and not limiting and is similar to but distinct from and independent of method 800. The method 900 may be altered, e.g., by having stages added, removed, rearranged, combined, and/or performed concurrently.

In an embodiment, stages 810, 815, 820, 825, and 830 of method 900 can proceed as described above with regard to FIG. 8.

At stage 935, a set of interior and exterior classified position points for a map tile are downloaded, by the position point determination module 250, from a database corresponding to the identified defined region 120. The position points can be classified as interior or exterior by an interior-exterior classification algorithm, as described above. The classification algorithm and the database may reside in the interior-exterior classification module 127 of the defined region server(s) 125. The map tile may be a set of position points proximate to the estimated mobile device position, as discussed above.

Additionally, and similarly to stage 835, expected AP signal characteristics are downloaded for each downloaded position point. As discussed above, the map tile may correspond to the entire defined region 120 or may correspond to an area proximate to the estimated mobile device position.

At stage 940, similarly to stage 840, measured AP signal characteristics and the downloaded expected AP signal characteristics are compared by the position point determination module 250 for each downloaded position point to determine a deviation.

At stage 945, a weight is assigned by the position point determination module 250 to each downloaded position point based on the deviation and the classification of the position point. The assigned weight serves as a weighting filter applied by the position point determination module 250 to constrain the position solution to position points appropriate for a particular application. For example, to constrain the position solution to interior points, the weight assigned to exterior points can be assigned to zero regardless of the deviation and the weight assigned to the interior points can be based on the deviation.

At stage 950, statistical analyses can exclude zero weight position points and can include and be limited to position points with a non-zero weight. The deviations for the included position points can be statistically analyzed similarly to stage 850 as described above. One downloaded, non-zero weight position point can be automatically selected as the mobile device location based on the statistical analysis.

In an implementation, at stage 950, the mobile device location automatically determined by the position point determination module 250 may be displayed or otherwise made available to a user via the user interface 270. The location may also be stored in memory 245 or sent to the network server(s) and or defined area server(s). The mobile device location may be used by the processor 240 for various applications, for example but not limited to, navigation applications, available to the mobile device 105.

Figure 10:
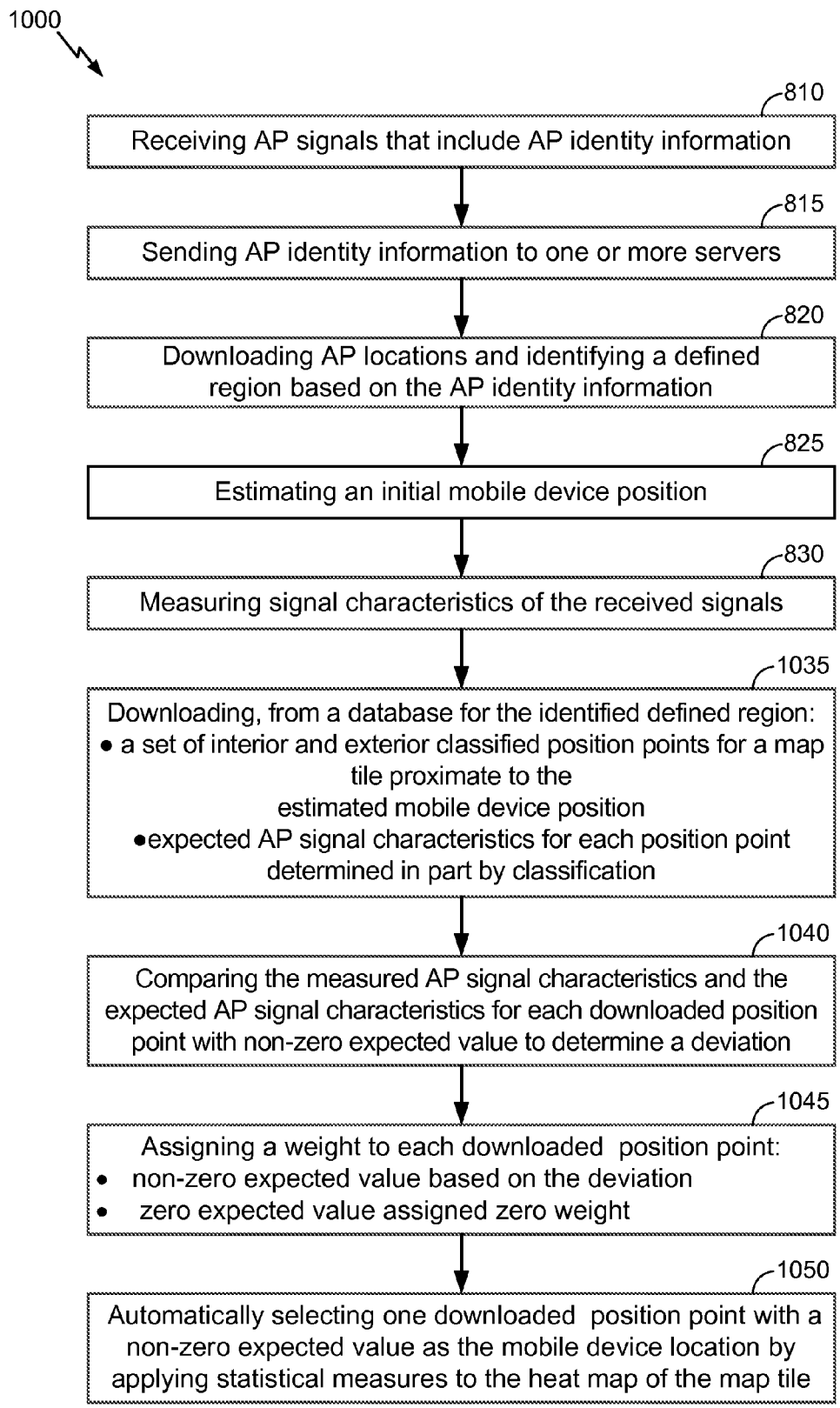
FIG. 10 is a flow diagram of a process for mobile device positioning utilizing an expected value filter.

Referring to FIG. 10, with further reference to FIGS. 1 and 2, a method 1000 using the system 100 and mobile device 105 includes the stages shown. The method 1000 is by way of example only and not limiting and is similar to but distinct from and independent of method 800. The method 1000 may be altered, e.g., by having stages added, removed, rearranged, combined, and/or performed concurrently.

In an embodiment, stages 810, 815, 820, 825, and 830 of method 1000 can proceed as described above with regard to FIG. 8.

At stage 1035, a set of interior and exterior classified position points for a map tile are downloaded by a position point determination module 250, from a database corresponding to the identified defined region 120. The position points can be classified as interior or exterior by an interior-exterior classification algorithm, as described above. The classification algorithm and the database may reside in the interior-exterior classification module 127 of the defined region server(s) 125. As discussed above, the map tile may correspond to the entire defined region 120 or may correspond to an area proximate to the estimated mobile device position.

Additionally, and similarly to stage 835, expected AP signal characteristics are downloaded for each downloaded position point. In an embodiment, the expected AP signal characteristics can be determined at the network server(s) 115 and/or defined region server(s) 125 for each position point based on calculated, or modeled, signals or based on signals measured during signal sampling of the defined region and based on the classification. An expected value of zero may be assigned to particular position points based on classification and regardless of calculated, modeled, or measured signals. By assigning an expected value of zero to particular position points based on classification, an expected value filter can be applied to constrain the position solution to position points appropriate for a particular application. For example, to constrain the position solution to interior points, an expected value of zero can be assigned to exterior points regardless of the expected value models or measurements associated with any exterior position point. Based on a location and/or navigation application running in the mobile device 105, mobile device 105 may instruct the network server(s) 115 and/or the defined region server(s) 125 to apply an expected value filter to the classified position points. The expected value filter may be implemented by the processor 129 of the interior-exterior classification module 127.

At stage 1040, similarly to stage 840, measured AP signal characteristics and the downloaded expected AP signal characteristics are compared by the position point determination module 250 for each downloaded position with a non-zero expected value to determine a deviation. Position points with an assigned zero expected value may be excluded from the comparison and a deviation may not be determined for these excluded points.

At stage 1045, a weight is assigned by the position point determination module 250 to each downloaded position point with a non-zero expected value based on the determined deviation. A weight of zero may be assigned to position points with an assigned expected value of zero.

At stage 1050, one position point with a non-zero weight can be automatically selected by the position point determination module 250 as the mobile device location based on the statistical analysis described above with regard to stage 850 of FIG. 8.

In an implementation, at stage 1050, the mobile device location automatically determined by the position point determination module 250 may be displayed or otherwise made available to a user via the user interface 270. The location may also be stored in memory 245 or sent to the network server(s) and or defined area server(s). The mobile device location may be used by the processor 240 for various applications, for example but not limited to, navigation applications, available to the mobile device 105.

Other embodiments are within the scope and spirit of the invention. For example, due to the nature of software, functions described above can be implemented using software, hardware, firmware, hardwiring, or combinations of any of these. Features implementing functions may also be physically located at various positions, including being distributed such that portions of functions are implemented at different physical locations.

Those of skill in the art would understand that information and signals may be represented using any of a variety of different technologies and techniques. For example, data, instructions, commands, information, signals, and symbols that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and algorithm steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium know in the art. A storage medium may be coupled, for example, to the processor such that the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal.

In one or more design examples, the functions described may be implemented in hardware, software, firmware, middleware, microcode, hardware description languages, or any combination thereof. When implemented in software, firmware, middleware, or microcode, the functions may be stored on or transmitted over as one or more instructions or code on a non-transitory computer-readable medium such as a computer storage medium. Processors may perform the described tasks.

Computer-readable media includes both computer storage media and communication media including any medium that facilitates transfer of a computer program from one place to another. A computer storage medium includes any medium that facilitates transfer of a computer program from one place to another. A computer storage media may be any available media that can be accessed by a general purpose or special purpose computer. By way of example, and not limitations, such computer-readable media can comprise RAM, ROM, EEPROM, CD-RIM or other optical disk storage, magnetic disk storage or other magnetic storage devices, or any other medium that can be used to carry or store desired program code means in the form of instructions or data structures and that can be accessed by a general-purpose or special purpose computer, or a general purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or mobile technologies such as infrared, radio, and microwave, then the coaxial cable, fiber optic cable, twisted pair, DSL, or mobile technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

The methods, systems, and devices discussed above are examples. Various alternative configurations may omit, substitute, or add various procedures or components as appropriate. Configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not limit the scope of the claims. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.).

As used herein, including in the claims, unless otherwise stated, a statement that a function or operation is "based on" an item or condition means that the function or operation is based on the stated item or condition and may be based on one or more items and/or conditions in addition to the stated item or condition.

Further, while the description above refers to the invention, the description may include more than one invention.

What is claimed is:

1. A method of determining a mobile device location, the method comprising:
   receiving one or more signals from one or more transmitters;
   measuring signal characteristics of the one or more received signals;
   downloading data from a database corresponding to a defined region associated with the transmitters wherein the downloaded data comprises a plurality of position points, a classification of each position point, and expected signal characteristics for each position point;
   determining a deviation between the measured signal characteristics and the expected signal characteristics for each position point;
   weighting each position point based on the deviation;
   constraining the plurality of weighted position points according to the classification of each position point; and
   determining the mobile device location by selecting one position point of the constrained plurality of weighted position points as a position point solution corresponding to the mobile device location.

2. The method of claim 1 wherein the classification of each position point is as an interior position point or as an exterior position point based on an output of an interior-exterior classification algorithm.

3. The method of claim 2 wherein the interior-exterior classification algorithm is a morphological operation function.

4. The method of claim 2 wherein the interior-exterior classification algorithm is a multiple ray mechanism.

5. The method of claim 2 wherein constraining the plurality of weighted position points comprises constraining to interior classified position points.

6. The method of claim 2 wherein constraining the plurality of weighted position points comprises assigning zero weight to each exterior classified position point.

7. The method of claim 1 comprising:
   determining transmitter identifying information from the received signals;
   downloading transmitter location information based on the transmitter identifying information; and
   estimating a mobile device position based at least in part on the transmitter location information;
   and wherein the downloaded data corresponds to a map tile associated with the estimated mobile device position.

8. The method of claim 1 wherein selecting one position point as the position point solution comprises using a statistical measure of the weights assigned to the position points.

9. An apparatus for determining a mobile device location, the apparatus comprising:
   a transceiver configured to receive one or more signals from one or more transmitters;
   one or more processors communicatively coupled to the transceiver and configured to:
   measure signal characteristics of the one or more received signals;
   download data from a database corresponding to a defined region associated with the transmitters wherein the downloaded data comprises a plurality of position points, a classification of each position point, and expected signal characteristics for each position point;
   determine a deviation between the measured signal characteristics and the expected signal characteristics for each position point;
   weight each position point based on the deviation;
   constrain the plurality of weighted position points according to the classification of each position point; and
   determine the mobile device location by selecting one position point of the constrained plurality of weighted position points as a position point solution corresponding to the mobile device location; and
a memory communicatively coupled to the one or more processors.

10. The apparatus of claim 9 wherein the classification of each position point is as an interior position point or as an exterior position point based on an output of an interior-exterior classification algorithm.

11. The apparatus of claim 10 wherein the interior-exterior classification algorithm is a morphological operation function.

12. The apparatus of claim 10 wherein the interior-exterior classification algorithm is a multiple ray mechanism.

13. The apparatus of claim 10 wherein the plurality of weighted position points is constrained to interior classified position points.

14. The apparatus of claim 10 wherein the position point solution is constrained according to the classification of each position point by assigning zero weight to each exterior classified position point.

15. The apparatus of claim 10 wherein:
the one or more processors are configured to:
determine transmitter identifying information from the received signals;
download transmitter location information based on the transmitter identifying information; and
estimate a mobile device position based at least in part on the transmitter location information;
the memory is configured to store the downloaded transmitter location information; and
the downloaded data corresponds to a map tile associated with the estimated mobile device position.

16. The apparatus of claim 9 wherein selecting one position point as the position point solution comprises using a statistical measure of the weights assigned to the position points.

17. An apparatus for determining a mobile device location, the apparatus comprising:
means for receiving one or more signals from one or more transmitters;
means for measuring signal characteristics of the one or more received signals;
means for downloading data from a database corresponding to a defined region associated with the transmitters wherein the downloaded data comprises a plurality of position points, a classification of each position point, and expected signal characteristics for each position point;
means for determining a deviation between the measured signal characteristics and the expected signal characteristics for each position point;
means for weighting each position point based on the deviation;
means for constraining the plurality of weighted position points weighted according to the classification of each position point; and
means for determining the mobile device location by selecting one position point of the constrained plurality of weighted position points as a position point solution corresponding to the mobile device location.

18. The apparatus of claim 17 wherein the classification of each position point is as an interior position point or as an exterior position point based on an output of an interior-exterior classification algorithm.

19. The apparatus of claim 18 wherein the interior-exterior classification algorithm is a morphological operation function.

20. The apparatus of claim 18 wherein the interior-exterior classification algorithm is a multiple ray mechanism.

21. The apparatus of claim 18 wherein the means for constraining comprises means for constraining to interior classified position points.

22. The apparatus of claim 18 wherein the position point solution is constrained according to the classification of each position point by assigning zero weight to each exterior classified position point.

23. The apparatus of claim 19 comprising:
means for determining transmitter identifying information from the received signals;
means for downloading transmitter location information based on the transmitter identifying information; and
means for estimating a mobile device position based at least in part on the transmitter location information; and
wherein the downloaded data corresponds to a map tile associated with the estimated mobile device position.

24. The apparatus of claim 17 wherein selecting one position point as the position point solution comprises using a statistical measure of the weights assigned to the position points.

25. A computer program product residing on a processor-readable non-transitory storage medium and comprising processor-readable instructions executable by one or more processors to:
receive one or more signals from one or more transmitters;
measure signal characteristics of the one or more received signals;
download data from a database corresponding to a defined region associated with the transmitters wherein the downloaded data comprises a plurality of position points, a classification of each position point, and expected signal characteristics for each position point;
determine a deviation between the measured signal characteristics and the expected signal characteristics for each position point;
weight each position point based on the deviation;
constrain the plurality of weighted position points according to the classification of each position point; and
determine a mobile device location by selecting one position point of the constrained plurality of weighted position points as a position point solution corresponding to the mobile device location.

26. The computer program product of claim 25 wherein the classification of each position point is as an interior position point or as an exterior position point based on an output of an interior-exterior classification algorithm.

27. The computer program product of claim 26 wherein the interior-exterior classification algorithm is a morphological operation function.

28. The computer program product of claim 26 wherein the interior-exterior classification algorithm is a multiple ray mechanism.

29. The computer program product of claim 26 wherein plurality of weighted position points is constrained to interior classified position points.

30. The computer program product of claim 26 wherein the position point solution is constrained according to the classification of each position point by assigning zero weight to each exterior classified position point.

31. The computer program product of claim 25 further comprising processor-readable instructions executable by the one or more processors to:
determine transmitter identifying information from the received signals;

download transmitter location information based on the transmitter identifying information; and estimate a mobile device position based at least in part on the transmitter location information; and wherein the downloaded data corresponds to a map tile associated with the estimated mobile device position.

32. The computer program product of claim 25 wherein selecting one position point as the position point solution comprises using a statistical measure of the weights assigned to the position points.

* * * * *